W. RUSSELL.
APPARATUS FOR SEPARATING SOLIDS FROM LIQUIDS.
APPLICATION FILED OCT. 27, 1916.

1,214,593.

Patented Feb. 6, 1917.
3 SHEETS—SHEET 1.

Inventor
William Russell.

By his Attorneys:

W. RUSSELL.
APPARATUS FOR SEPARATING SOLIDS FROM LIQUIDS.
APPLICATION FILED OCT. 27, 1916.
1,214,593.
Patented Feb. 6, 1917.
3 SHEETS—SHEET 2.
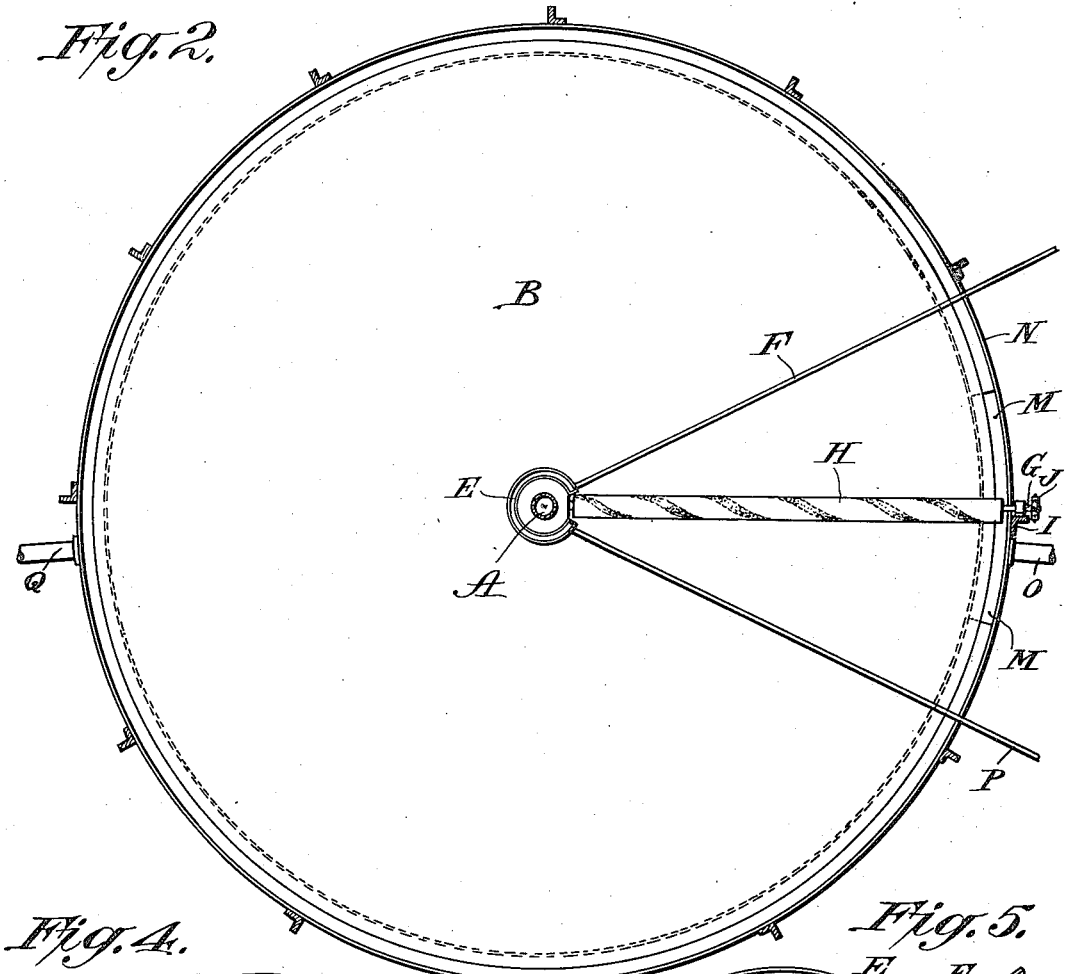
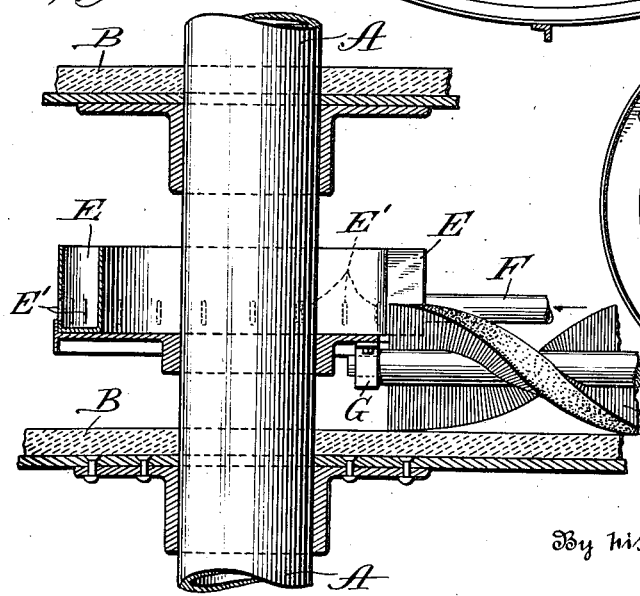
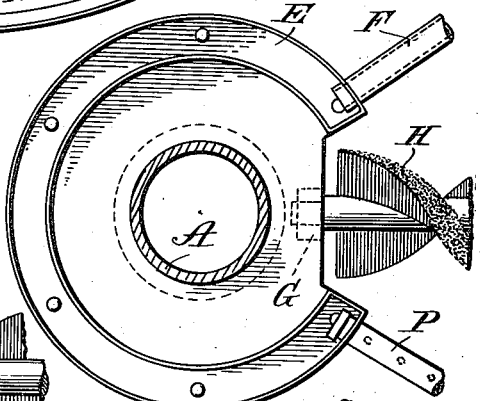
Inventor
William Russell
By his Attorneys
Baldwin Wright W. RUSSELL.
APPARATUS FOR SEPARATING SOLIDS FROM LIQUIDS.
APPLICATION FILED OCT. 27, 1916.

1,214,593.

Patented Feb. 6, 1917.

3 SHEETS—SHEET 3.

Inventor
William Russell,

By his Attorneys
Baldwin & Wight

UNITED STATES PATENT OFFICE.

WILLIAM RUSSELL, OF LONDON, ENGLAND, ASSIGNOR TO THE DORR COMPANY, OF DENVER, COLORADO, A CORPORATION OF DELAWARE.

APPARATUS FOR SEPARATING SOLIDS FROM LIQUIDS.

1,214,593.

Specification of Letters Patent.     Patented Feb. 6, 1917.

Application filed October 27, 1916. Serial No. 128,101.

*To all whom it may concern:*

Be it known that I, WILLIAM RUSSELL, a subject of the King of Great Britain, residing at 16 South street, in the city of London, England, have invented certain new and useful Improvements in Apparatus for Separating Solids from Liquids, of which the following is a specification.

This invention relates to apparatus especially applicable to the separation of starch, china clay or solid sewage matters from the liquids in which they are suspended.

According to this invention pulp, consisting of solids held in suspension in liquids, is caused to flow in a very thin layer or film onto a slightly inclined table at such a speed that the solids remain on the table while the liquid drains off. The thickness of the film varies according to circumstances and the materials in the pulp but it may in cases where quick settlement is desired be 1/200th of an inch. The inclination of the table is usually very small being less than one per cent.

Preferably I run pulp on to a plurality of circular superimposed tables, slightly inclined toward their outer peripheries, where troughs are provided to catch the liquid. The tables may be secured to a central shaft which is caused to revolve slowly or may be held in frames, the tables may be constructed of wood, metal, glass preferably frosted, or cement, in the latter case the cement may be held in a metal pan. Scraping conveyers, such as brushes or screw conveyers, reciprocating scrapers or the like, are provided to effect the removal of the deposit on the tables.

Figure 1:
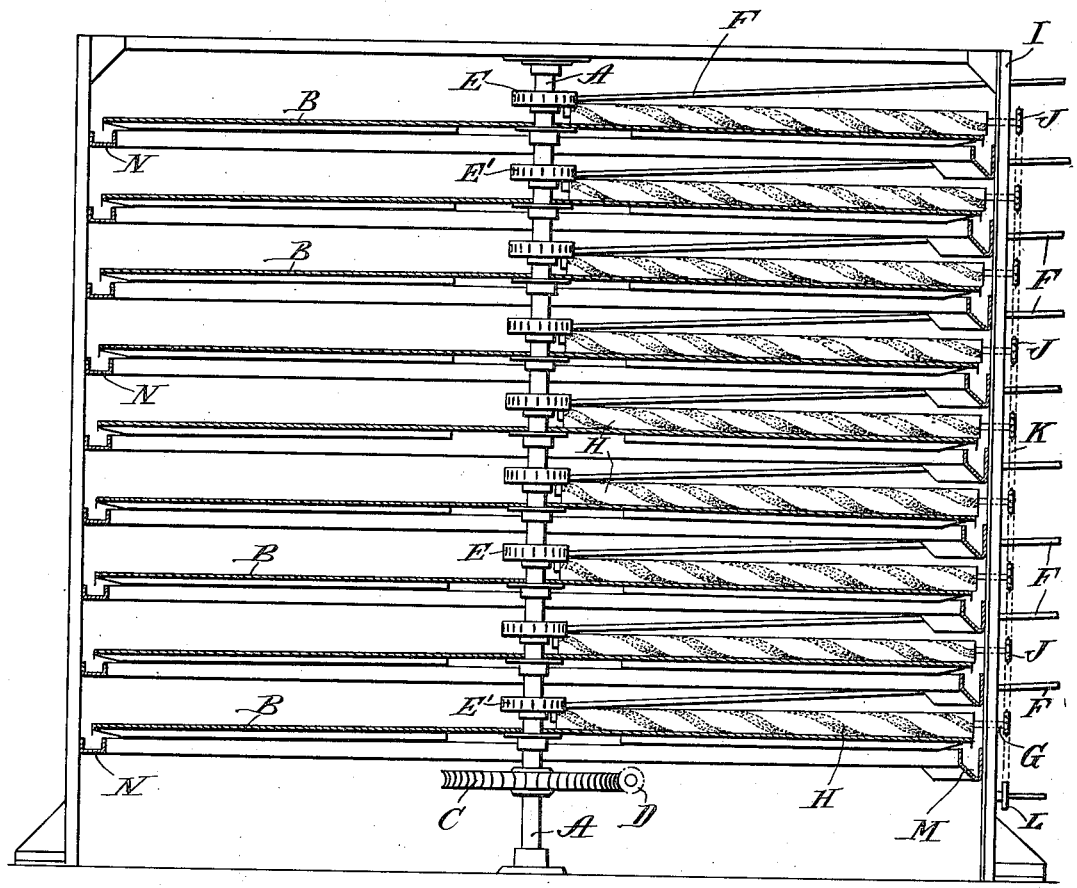
Figure 3:
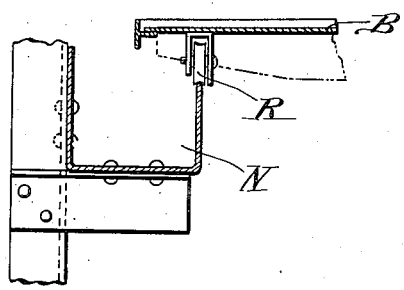
Figure 7:
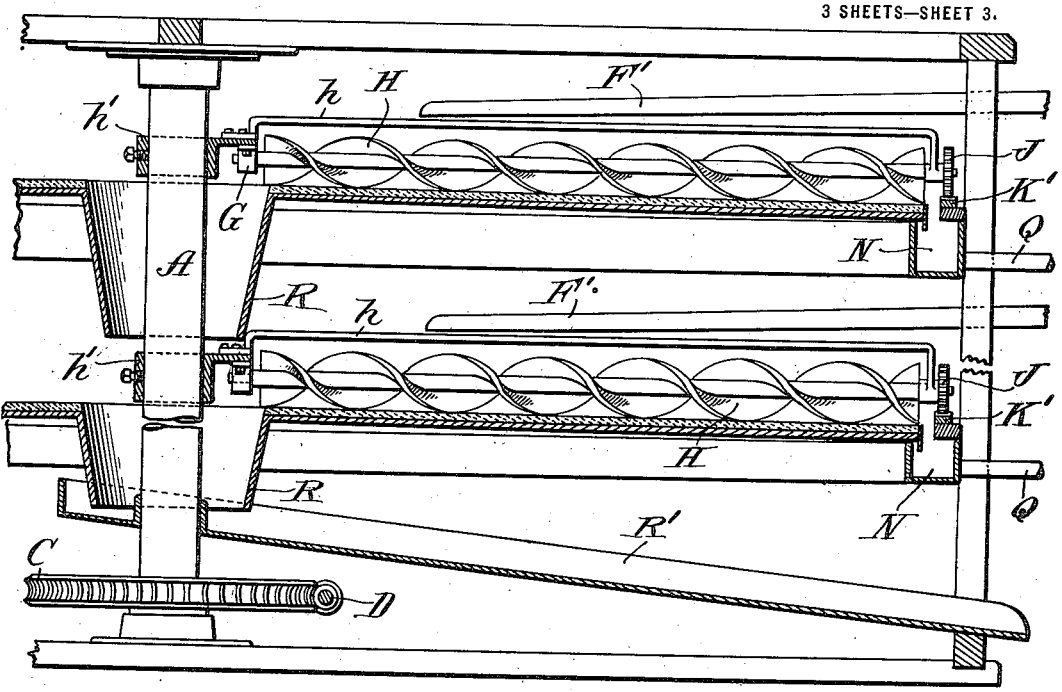
Figure 6:
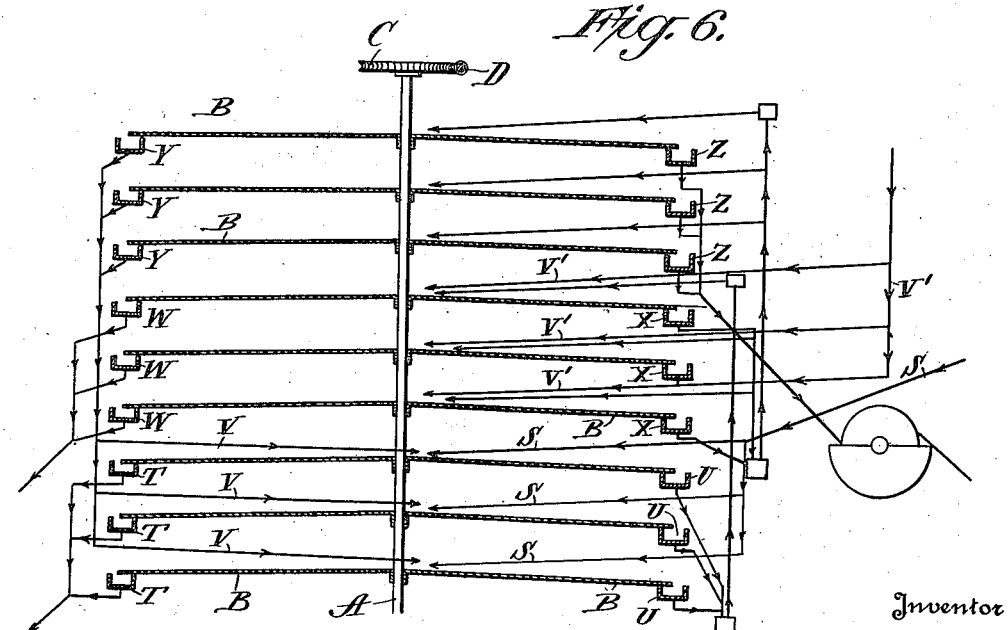

Figures 1 to 5 show the apparatus made in accordance with this invention. Fig. 1 is a section partly in elevation, Fig. 2 is a plan of one of the tables, Fig. 3 is a local section showing the method of supporting the tables near their peripheries, Fig. 4 is a local section showing the distributing box which supplies the pulp to the tables and Fig. 5 is a plan of the same. Fig. 6 shows diagrammatically a modified apparatus. Fig. 7 is a sectional view showing a modification.

In Figs. 1 to 5 a central shaft A has secured to it a number of slightly inclined tables B and a worm wheel C driven by a worm D. To the shaft A are also secured distributing boxes E having in their outer walls slots $E^1$ through which the pulp runs on to the tables B. The pulp is supplied to the distributing boxes E through pipes F. Shafts G carrying brushes H are mounted in bearings upon the distributing boxes E and upon an upright I, and on the outer ends of the shafts G are sprocket wheels J; a chain K gears with the sprocket wheels J and also with another driven sprocket wheel L, by which the brushes H are caused to revolve. The revolving brushes cause the deposited matter to pass from the tables into pockets M in receiving troughs N from which it is discharged through pipes O, and pipes P secured to the distributing boxes E are also provided to supply water when it is necessary to moisten the solid matter before removal from the tables. The water from the pulp drains off into the troughs N and passes away through pipes Q. The troughs N also act as supports for the tables B, which are provided on their undersides with rollers R as is shown in Fig. 3.

In operation, the pulp is supplied through the pipes F to the distributing boxes E from whence it passes through the slots $E^1$ on to the slightly inclined and slowly revolving tables B. The deposited matter is removed from the tables by the brushes H into the pockets M while the water drains off into the receiving troughs N.

In the apparatus shown in Fig. 6 which consists as before of a central shaft A to which is secured a number of slightly inclined tables B and a worm wheel driven by a worm D, the pulp is fed through pipes S on to the three lowest tables, the liquid draining off into troughs T while the solid matter is scraped off into troughs U, the water used for moistening the deposited matter if necessary being obtained from the liquid draining off from the three topmost tables and supplied through pipes V. The pulp that is removed from the three lowest tables is pumped to the three middle tables, the water draining from it passing into the troughs W, while the deposited matter passes into troughs X from whence it is pumped up to the three topmost tables. The water drains off the three topmost tables into troughs Y, being used to moisten the deposited matter on the three lowest tables as before described, while the deposited matter passes to troughs Z and thence to any suitable filter. Water for moistening the deposited matter on the three middle tables is supplied through pipes V¹.

In Fig. 7 a modification is shown in which the tables are made stationary while the brushes rotate about their own axes and revolve bodily about the axis of the shaft A. The shaft A is driven as before by a worm D engaging a worm wheel C on the shaft. The tables are inclined in the manner before described and deliver the water to troughs N having discharge pipes Q. The pulp is supplied to the tables by troughs F¹ and the solid matter is conveyed from the tables to the chutes R which deliver to a conveyer R¹. The outer ends of the shafts of the brushes H are supported by frames h secured to collars h¹ attached to the rotary shaft A, while the inner ends of the brushes are supported by the collars h¹. The outer ends of the brush shafts carry pinions J engaging annular racks K¹ supported by the main frame of the apparatus. As the shaft A revolves the brushes are revolved about the axis of the shaft and at the same time the brushes are individually rotated about their own axes. In this case the solids collected on the tables are moved inward by the brushes to the chutes R, while the water flows outward to the troughs N.

It will be observed by reference to Fig. 5 that the distributing box, while of a general annular form, is not continuous; its ends being separated a considerable distance and closed so that as indicated in Fig. 2 there is a segmental portion of the table which does not receive pulp directly from the box and therefore the water or liquid does not flow directly down over this portion of the table. It will also be observed that the brush H is arranged radially over the part of the table last referred to and extends from the distributing box to the periphery of the table where the receiving pocket M is located. In this way the brush is made to operate on comparatively dry material. As shown, the brush has the bristles spirally arranged in such manner as to move the deposited material continuously and radially to the receptacle which receives the solid matter.

What I claim is:—

1. Apparatus for separating solids from liquids, comprising a table inclined slightly downward from its center to its periphery and from which the liquid drains, a trough for receiving the liquid, a separate receptacle for the solid matter, means for supplying pulp to the central portion of the table, devices for detaching the deposited material from the table and for moving it radially toward the receiver for solid matter.

2. Apparatus for separating solids from liquids, comprising a table inclined slightly downward from its center to its periphery and from which the liquid drains, a distributing box partially surrounding the axis of the table, and having a closed portion on one side, and devices extending radially from said closed portion of the box for detaching the deposited material from the table and for moving it radially toward the receptacle for the solid matter.

3. Apparatus for separating solids from liquids, comprising a rotary table slightly inclined downward from its center to its periphery and from which the liquid drains, means for distributing pulp on the central portion of the table, means for mechanically removing solid matter deposited on the table, a trough extending partly around the periphery of the table and adapted to receive the liquid drained from it, and a pocket having a discharge opening into which the solid matter is directed.

4. Apparatus for separating solids from liquids, comprising a table inclined slightly downward from its center to its periphery and from which the liquid drains, a distributing box partially surrounding the axis of the table and having a closed portion on one side, means for slowly rotating the table, a rotary brush having spirally arranged bristles extending from the closed portion of the distributing box toward the periphery of the table, means for receiving solid matter from the brush and means for collecting liquid draining from the table.

WILLIAM RUSSELL.